United States Patent
Titichoca Aguirre et al.

(10) Patent No.: US 11,559,816 B2
(45) Date of Patent: Jan. 24, 2023

(54) SYSTEM AND A PROCESS TO DETERMINE ONLINE THE CHARACTERISTICS OF EXPENDED BALLS AND THE STITCHES OF THE SAME, WHICH HAVE BEEN EXPULSED FROM A SEMIAUTOGEN MINERAL GRINDING MILL

(71) Applicants: LMagne Ingeniería Ltda., Santiago (CL); Sociedad de Innovación y Transferencia Tecnológica Ltda., Viña del Mar (CL); Estudio, Asesorías Y Capacitación Altoya Ltda, Santiago (CL)

(72) Inventors: Gilda Titichoca Aguirre, Santiago (CL); Ennio Perelli Bacigalupo, Viña del Mar (CL); Germán Sepúlveda Villalobos, Viña del Mar (CL); Jaime Díaz Cid, Viña del Mar (CL); Patricio Castillo Pizarro, Viña del Mar (CL); Eduardo Altamirano Cabrera, Santiago (CL)

(73) Assignee: LMAGNE INGENIERIA LTDA., Santiago (CL)

( * ) Notice: Subject to any disclaimer, the term of this patent is extended or adjusted under 35 U.S.C. 154(b) by 756 days.

(21) Appl. No.: 16/492,466

(22) PCT Filed: Mar. 8, 2018

(86) PCT No.: PCT/CL2018/050014
§ 371 (c)(1),
(2) Date: Sep. 9, 2019

(87) PCT Pub. No.: WO2018/161185
PCT Pub. Date: Sep. 13, 2018

(65) Prior Publication Data
US 2020/0282405 A1 Sep. 10, 2020

(30) Foreign Application Priority Data

Mar. 9, 2017 (CL) .................................. 0574-2017

(51) Int. Cl.
*B02C 17/18* (2006.01)
*G05B 19/418* (2006.01)
(Continued)

(52) U.S. Cl.
CPC ...... *B02C 17/1805* (2013.01); *G05B 19/4183* (2013.01); *G05B 19/4187* (2013.01);
(Continued)

(58) Field of Classification Search
None
See application file for complete search history.

(56) References Cited

U.S. PATENT DOCUMENTS

2005/0160667 A1* 7/2005 Weinberg ................ F26B 3/347
44/620
2018/0093469 A1* 4/2018 Sakurada ............... B41J 2/0057
(Continued)

FOREIGN PATENT DOCUMENTS

WO  2013067651  5/2013
WO  2016000024  1/2016

OTHER PUBLICATIONS

WIPO, ISR for PCT/CL2018/050014, Jul. 6, 2018.

*Primary Examiner* — Phirin Sam
(74) *Attorney, Agent, or Firm* — Hodgson Russ LLP

(57) ABSTRACT

The invention relates to the field of operating, monitoring and controlling mills of the mining industry. It specifically relates to a system and a method for in-line determination of the characteristics of worn balls and pieces thereof, which have been ejected from a semi-autogenous mineral grinding (SAG) mill to the external classifiers.

10 Claims, 6 Drawing Sheets

(51) Int. Cl.
*G05B 23/02* (2006.01)
*G06T 7/00* (2017.01)

(52) U.S. Cl.
CPC ... *G05B 19/4188* (2013.01); *G05B 19/41815* (2013.01); *G05B 23/0283* (2013.01); *G06T 7/0004* (2013.01); *B02C 2210/01* (2013.01); *G06T 2207/30164* (2013.01)

(56) References Cited

U.S. PATENT DOCUMENTS

| | | | |
|---|---|---|---|
| 2018/0229273 A1* | 8/2018 | Carvajo Lucena | C10L 5/445 |
| 2019/0387704 A1* | 12/2019 | Hall | B07B 1/04 |

* cited by examiner

SYSTEM AND A PROCESS TO DETERMINE ONLINE THE CHARACTERISTICS OF EXPENDED BALLS AND THE STITCHES OF THE SAME, WHICH HAVE BEEN EXPULSED FROM A SEMIAUTOGEN MINERAL GRINDING MILL

CROSS-REFERENCE TO RELATED APPLICATIONS

This application is a U.S. national phase entry of International Application No. PCT/CL2018/050014, filed Mar. 8, 2018, which claims priority to Chilean Patent Application No. 0574-2017, filed Mar. 9, 2017, the entire disclosures of which are incorporated herein by reference.

TECHNICAL FIELD OF THE INVENTION

This invention is developed in the field of operations, monitoring & control of mining mills. It specifically deals with a system & process aimed to detect online the features of worn out balls and/or ball pieces coming out from the SAG Mill (SAG) conveyed to the external screens (screens or trommels) which have a determined sieving size so that grinded material passes through the screen and continues its way through the milling process, while the oversize material remains on the surface.

BACKGROUND OF THE INVENTION

A SAG Mill (SAG Mill) (1) is an equipment, which basically is made up of a horizontal rotating drum, with a charge end (6) where ore to be grinded gets in and a discharge end (7) of grinded ore that has reached the desired size, on the other side. At the charge end (6) some other metal grinding media are also added, generally these are rounded balls, named as grinding balls. In case of wet grinding, water is also added. In this way, the internal charge of the SAG Mill is made up of grinding balls, ore and water (8) all of them rolling constantly inside the Milling Chamber (2) while the SAG Mill is spinning. FIGS. 1 to 3 show the internal charge (8) of the SAG Mill (1) is made up of ore (10), balls (9) and water, in case of wet grinding. Both the ore and the balls of the internal charge (8) inside the Milling Chamber (2) reduce their size, due to the constant spinning of the SAG Mill (1), as the ore (10) and the balls (9) when tumbling are hit among each other thus causing grinding of the ore (10) and also abrasion, due to the constant relative friction among the different materials, apart from the attrition when the ore particles (10) are simultaneously subject to friction and compression forces, because of the tumbling charge. When the ore (10) contained in the charge (8) reaches its set size, it passes through the slots (5) of a screen (4) from the Milling Chamber (2) to the Discharge Chamber (3), and then comes out of the SAG Mill (1) through the discharge end (7).

One of the most important components of a SAG Mill when milling ore is the internal grating (4), which has several slots (5) with a determined size, so that the ore (10) reaching such size comes out of the SAG Mill (1). The balls (9) used as grinding components in the SAG Mill (1), when added to the SAG Mill have a size higher than that of the slot (5).

As the process continues, the balls (9) become worn out due to abrasion and their diameter is getting smaller, thus becoming smaller balls (11) reaching the slot size (5) and, therefore, also passing through the Discharge Chamber (3) and then leaving the discharge end (7) thus coming out of the SAG Mill (1). Likewise, during the milling process, balls (9) get broken. These broken balls (12) also reach a size which is enough to pass through the slot (5), just as shown in FIG. 3. According to the foregoing, the grinded ore (10) the worn out balls (11) the pieces of broken balls (12) come out of the SAG Mill (1) and also water when dealing with wet grinding.

During the operation of the SAG Mill, the grating (4) can also get cracked in one of the sections, just as shown in FIGS. 4 and 5. In this way, the opening covers two linked slots (5), thus causing a bigger opening (13), through which ore (10) and bigger size balls (9) may pass through, which should remain inside the Milling Chamber (2). This problem can be seen in FIG. 5 of the Prior Art. Cracks on the gratings may also happen elsewhere in other areas, such as for example, at a corner, thus generating bigger openings, just as shown in FIG. 7. Just as the foregoing, there is a possibility that cracks have various shapes.

When the SAG Mill rotates the kinetic energy generated on the internal charge passes through several stages during the process. This is the main energy the internal charge (8), ore, water and grinding components have. Part of it becomes heat energy transferred to the water, ore (10) and the balls (9). Mainly the latter two as they remain a longer time inside the Milling Chamber (2), until their size is reduced enough to leave the SAG Mill (1). Out of these two, grinding components (9) remain in the Milling Chamber (2) a much longer time than the ore (10), reaching to periods of 20 a 40 days or longer, depending on process conditions, size of replenished ball and size of the opening in the screen. That is why grinding components have a higher increase in heat energy.

Likewise, under certain conditions, the energy generated when balls (9) crash is high enough as to fracture or break them, so they can come out of the Milling Chamber (2) of the SAG Mill (1) as broken balls (12), just as shown in FIGS. 3 and 6.

Regarding effectiveness of the milling process, it is important to keep a constant amount of balls (9) in the Milling Chamber (2); therefore, non controlled loss of balls (9) due to balls wearing out and/or breaking or because the screen (13) is broken are situations to be detected ASAP in order to take control actions. It is important to highlight that the high costs of the milling process are allocated on power consumption used to rotate the SAG Mill and purchase of grinding components.

That is why it is necessary to know—as accurately as possible—the amount of grinding components coming out from the SAG Mill, in order to replenish the necessary amount of balls and keep their constant flow inside the Milling Chamber. It is also important to know if the balls come out as worn out balls or cracked balls, thus allowing to take actions on the milling process and/or on the quality of the balls.

In the state of the Art there have been some attempts to solve part of this problem. For instance, the document WO 2016/000024 mentions a Monitoring Device, i.e. a case-protected camera which is fixed to a structure at the discharge end of the feeding duct and connected to a flange coming out of the outlet structure. The flange is also compatible with a light embedded in a protecting case. The feeding duct feeds the ore in the mill. The cases of the camera and the light have a sight glass cleaned by using water blasting. The sight glass is protected by a shade which can be opened for internal inspection of the mill. The arrangement allows to classify the charge inside the mill while the mill is still under operations.

The document WO 2013/067651 mentions a direct Visual Monitoring System capable of scanning inside the rotating mill. This device is made up of a Monitoring Unit, one Main Control Unit and one Operation & Management Unit. The Monitoring Unit is positioned inside the Feeding chute and is adjusted, according to the physical features of such feeding chute and the dimensions of the mill, in order to have a direct view from inside the mill. The operating method is to install a set of sensors to measure temperature inside the mill; to determine the acceleration at the vertical axis, the side horizontal axis and the front horizontal axis, according to time; to take bidimensional images on geometric conditions/thermal bidimensional images inside the mill; and perform remote detection in one or more plans.

The document WO 2007/124528 mentions a Monitoring Method for a SAG Mill or an AG Mill. The Monitoring Method of the mill deals with taking real time images of the charge arrangement inside the mill when it is spinning. The method also includes using a processor to take pictures of the charge inside the mill, while the charge is tumbling, in order to determine what portion is in contact with the inner wall of the drum of the mill in the areas that are detected.

In the Prior Art there are some components aimed to determine internal charge arrangement, based on temperature changes captured by infrared-spectrum scanning cameras, as the charge modifies the thermal radiation or emissivity. However, none of these components can scan outside the mill, at the discharge end, not to mention the surface of the external screen or the conveyor belt that removes ore particles and balls exceeding the slot of the external screen. Identification and featuring of the worn out balls or balls pieces coming out from the mill are not considered either.

That is why, one of the goals of this invention is to implement a system aimed to detect worn out balls and balls pieces passing through the screen of the SAG Mill which are stuck on the surface of the mill external screen, whether this is a screen or a trommel. If it is not possible to physically perform detection at the screen, this is performed on the surface of the conveyor belt removing the material stuck on the surface of the screen.

A second goal of this invention is to quantify the worn out balls and balls pieces passing through the screen of a SAG Mill which get stuck on the surface of the mill external screen, whether it is a screen or a trommel or on the conveyor belt. Apart from determining the amount of worn out balls and balls pieces their shape and size shall also be determined.

A third goal of this invention is to indirectly detect the damages on the internal grating of the SAG Mill, by identifying the balls and ore with a bigger size than that of the slot size of the screen. If oversize material comes out from the SAG Mill, an alarm shall be triggered to be used for process control.

A fourth goal this invention, is to send an alarm for the Process Control System when feature parameters of the ore and/or balls coming out from the SAG Mill are out of range, for instance, excess of broken balls and/or change of the geometric features of the pieces coming out, for instance, change of shape from rounded to irregular shape, broken, etc.

A fifth goal of this invention is to determine the slot size at the internal grating, by determining the maximum size of the balls and/or ore coming out from the SAG Mill, thus avoiding to stop the SAG Mill to take some direct measurements.

A sixth goal of this invention is to calculate an online approximation of the steel inventory trend inside the mill (level of volumetric filling of the balls), when the mill ball-feeding information is entered in the system.

DESCRIPTION OF THE INVENTION

This invention deals with a system and process implemented at the outlet of a SAG Mill for ore grinding and at the external screens of the mill, screens or trommels classifying the ore and the balls coming out from the SAG Mill. This is a system comprised of one or several digital cameras. Each of them is light-sensitive on various wave lengths, such as, visual spectrum and some range of the infrared spectrum, such as, thermal range. These devices can be pointed to the surface of the external screen where the oversize material coming out from the mill moves. The infrared light-sensitive camera detects the steel pieces of balls, due to the thermal radiation or emissivity produced by them when coming out from the SAG Mill. The steel captures more thermal energy than the ore, as it remains a longer time inside the mill and because the internal charge of the mill constantly tumbles. The images captured by the camera within the visual spectrum allow to determine the size of the balls, balls pieces and oversize ore coming out from the SAG Mill, as the visual spectrum camera can provide a better resolution. These digital cameras capture and record in their memory the images, whether they are infrared spectrum or visual spectrum.

The system can equally correlate the temperature value, thermal radiation or emissivity of the balls and the ore, in order to process the data and get the resulting information.

This invention shall allow to identify balls pieces coming out from the SAG Mill, thus making a differentiation of balls and ore and featuring the size of the balls pieces not passing the screen or trommel and remain on the surface. Quantification and classification of the amount of steel coming out from the SAG Mill shall also be possible The steel shall be classified as worn out balls, i.e., those coming out as rounded pieces, broken balls or in general, any other new morphological type of interest for the operational assessment of the mill and for quality analysis of the grinding media.

This invention shall help manage the internal charge of the balls in SAG Mills. It shall also allow to manage steel consumption as grinding component, as it shall provide online information used to make the decision to replenish with new balls, according to the amount of balls pieces coming out from the mill. It shall also allow to take corrective actions, as if an excessive amount of cracked balls come out from the mill, an assessment can be made if, on the one hand, the quality of the steel of the balls is not good; therefore, it is necessary to have a further discussion with the supplier regarding their manufacturing process or else change them. On the other hand, it is possible to assess if operating conditions make balls break, thus allowing to correct operational parameters.

Additionally, the system and process of this invention shall be capable to immediately determine if the internal grating of the SAG Mill is cracked. This is done when oversize balls and/or ore pieces come out with a size equivalent to the size of the hole. (FIGS. 4 and 5).

BRIEF DESCRIPTION OF THE DIAGRAMS

The attached diagrams are provided for a better understanding of the invention and are part of this description. They also illustrate some of the preferred executions of this invention.

COMPREHENSIVE DESCRIPTION OF THE INVENTION

Figure 1:
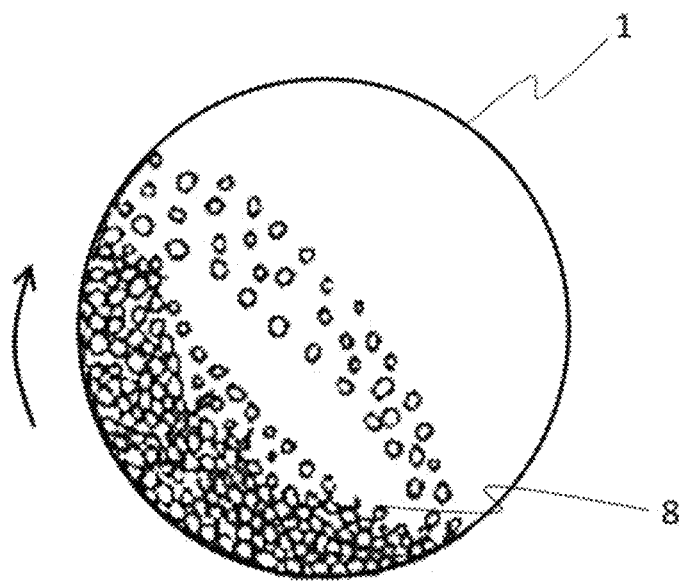
FIG. 1 shows a cross cutting section of a SAG Mill grinding the Prior Art, spinning on its axis, in order to reduce ore size.
Figure 2:
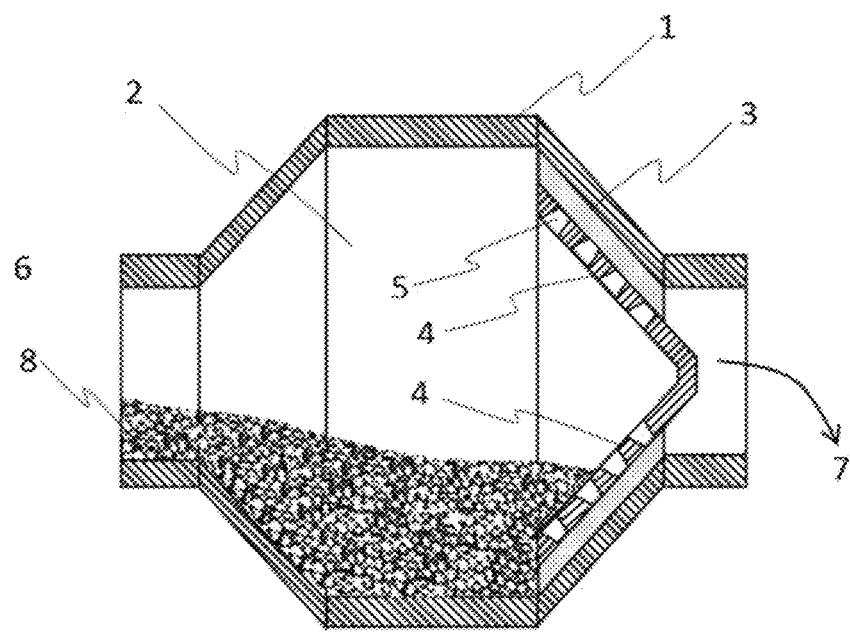
FIG. 2 shows a longitudinal section of a SAG Mill milling the Prior Art.
Figure 3:
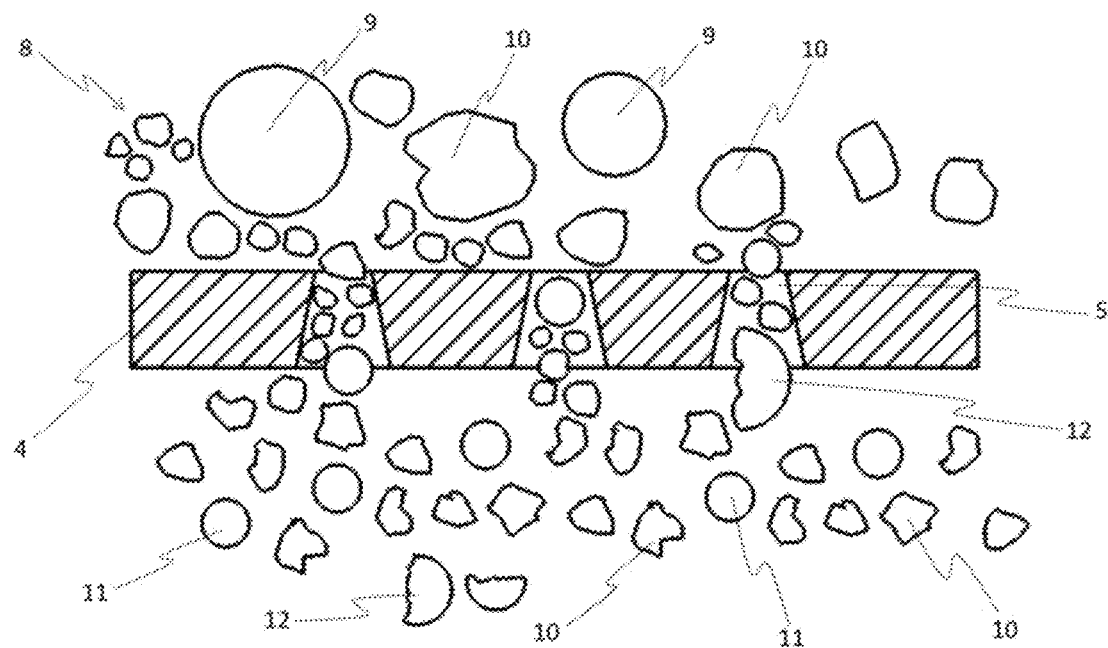
FIG. 3 shows the diagram of a screen of the Prior Art with the charge inside the SAG Mill passing through the screen.
Figure 4:
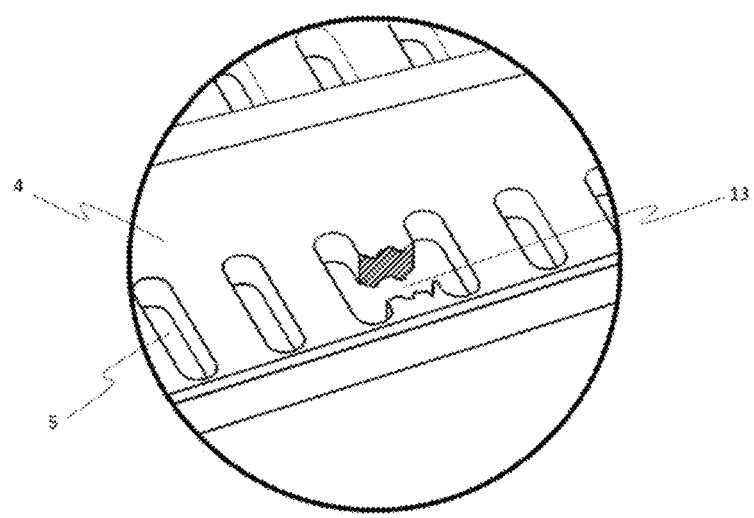
FIG. 4 shows an enlarged perspective view of a cracked screen, thus making a hole where balls and/or oversize ore pass through which should remain in the milling chamber.
Figure 5:
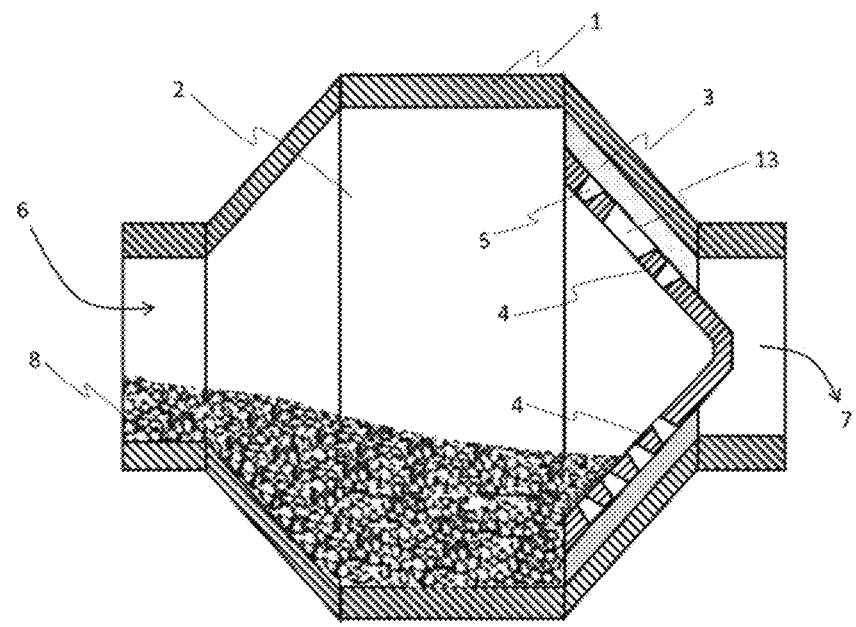
FIG. 5 shows a longitudinal section of a SAG Mill milling the Prior Art, with the screen cracked in one of its nerves.
Figure 6:
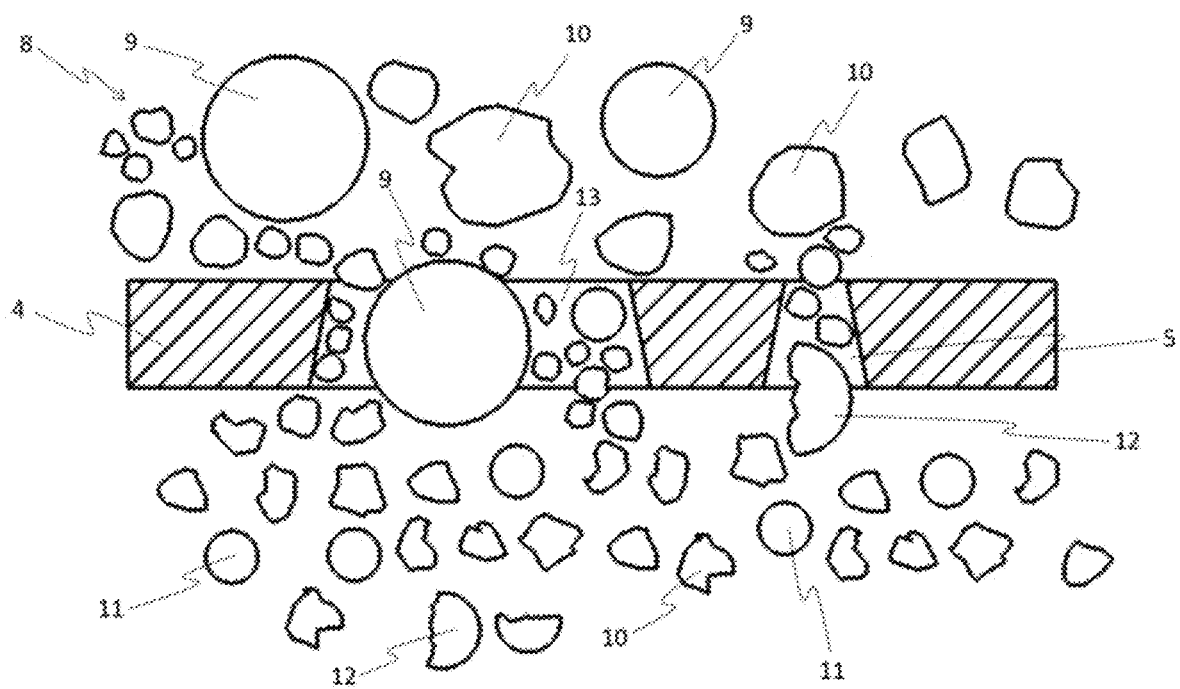
FIG. 6 shows a diagram when a whole ball—added to the mill—is coming out through a hole made by a crack on the screen, thus pieces and oversize ore can come out.
Figure 7:
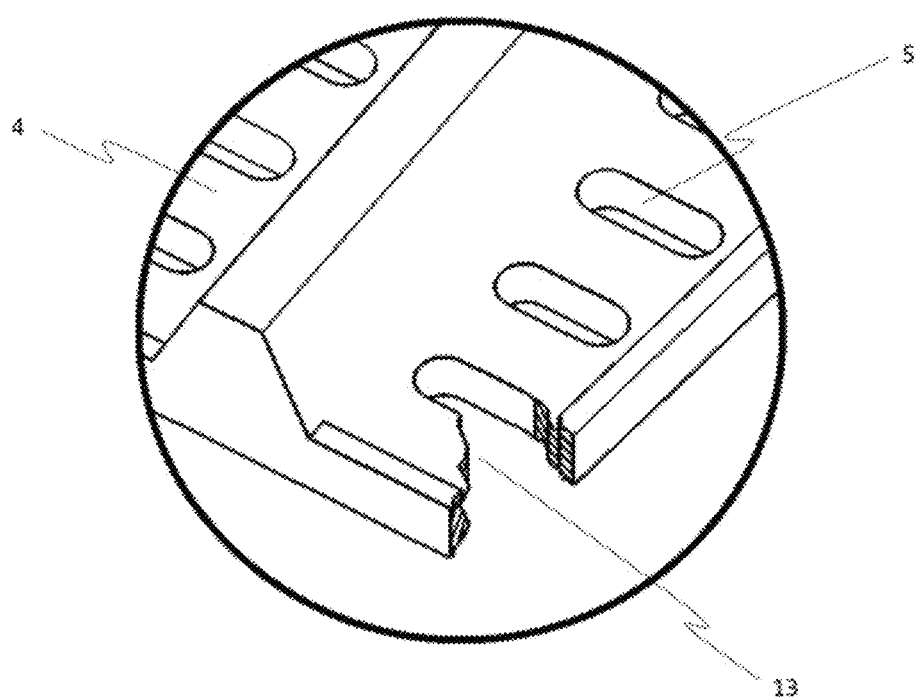
FIG. 7 shows an enlarged perspective view of a screen cracked on a corner. Balls and oversize ore that should remain in the Milling Chamber come out through this hole.
Figure 8:
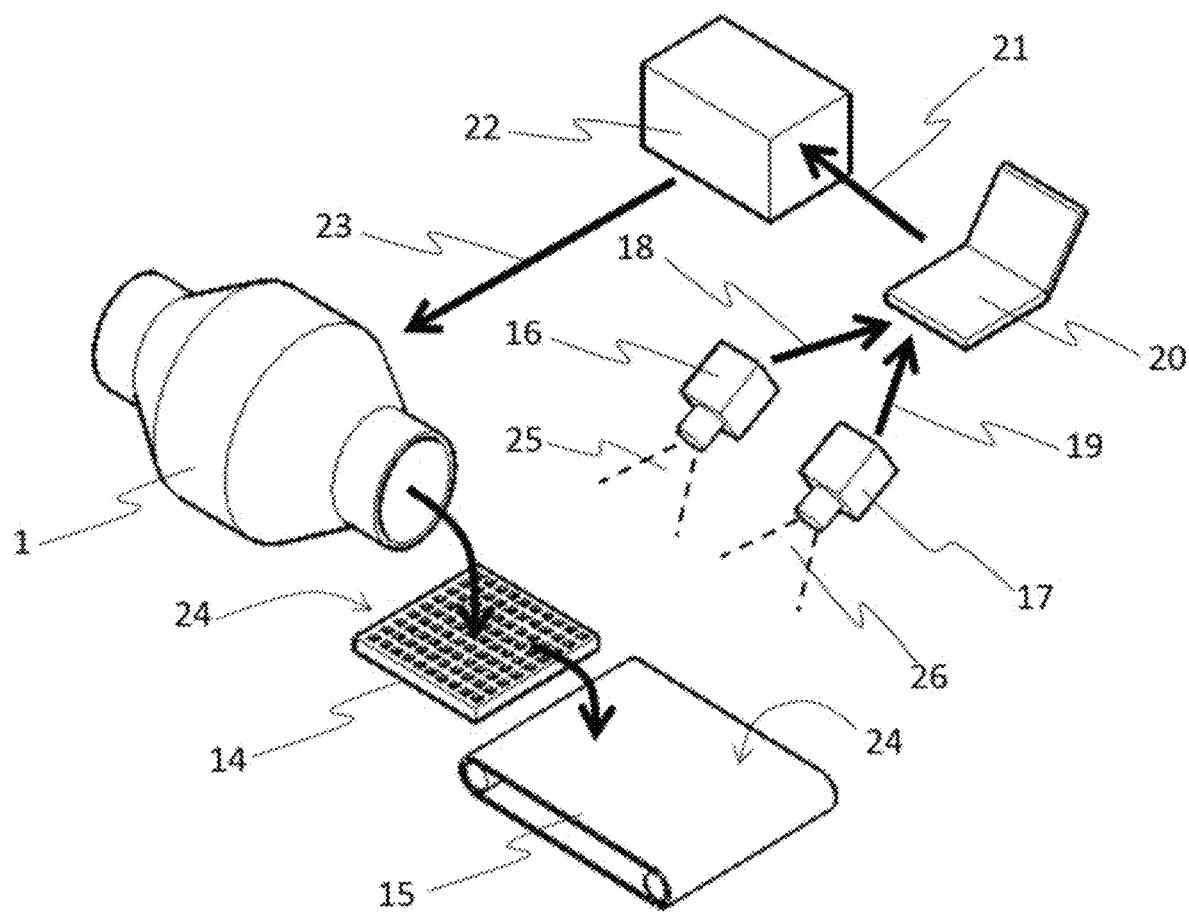
FIG. 8 shows a cross-sectional side view of the system components, in order to identify, quantify and feature worn out and/or broken balls coming out from the SAG Mill.

This invention deals with a system associated to a SAG Mill (1) for milling ore. The system is installed outside the SAG Mill (1) in an area which allows to watch the surface of the external ore screen, namely a screen or a trommel (14), or else the surface of the conveyor belt (15) conveying the oversize of the external screen. Just as shown in FIG. 8, in order to watch the screen or trommel (14) surface or conveyor belt (15) at least one digital camera is installed within a range of the infrared spectrum (16), such as, thermal range, in order to detect emissivity, i.e. thermal radiation emitted by the surface of a body, due to its temperature. The infrared spectrum camera (16) detects the emissivity of the balls and balls pieces, different from that of minerals coming out from the SAG Mill (1). Likewise, in order to watch the surface of the screen or trommel (14) or the conveyor belt (15) at least one visual spectrum (17) high-resolution digital camera is installed. In this way dimensions of the balls, balls pieces and oversize ore coming out from the SAG Mill are determined. The images taken with the high-resolution visual spectrum (17) camera allow to determine the dimensions of the balls, balls pieces and oversize ore coming out from the SAG Mill. The visual spectrum camera can provide a higher resolution. These are digital cameras capturing and recording the images, either with infrared spectrum or with visual spectrum.

The infrared spectrum camera (16) has wireless infrared image (18) data transmission capabilities. The visual spectrum camera (17) has wireless data transmission capabilities for visual spectrum images (19). The data (18, 19) transmission media send the data to a data processing media (20), either a processor, a computer, a Programmable Logic Controller (PLC) or similar. The data processing media (20) have reception media (not shown here) for the data sent by the cameras (16, 17).

The surface of the external screen, either a screen or a trommel (14) becomes an important component of this invention. The same applies if the process is performed on the conveyor belt (15). This surface work as a screen (24) providing information for the system.

Inside the mill (1) ore (10) and balls (9) are contained during the milling process. All this material rotates thus causing breakage, grinding and abrasion of the ore. The tumbling movement of the internal charge produces heat, and the balls (9) reach a high temperature, as they remain for a longer time inside the SAG Mill (1).

Taking advantage of this physical phenomenon, at least one infrared spectrum camera—at the discharge end of the SAG Mill (1) and in the surrounding area of the external screens, screens or trommels (14), (16)—is installed. This camera points to the surface of the screen (24) on these external screens (14), or onto the surface of the conveyor belt (15) in order to capture and record the image of balls and/or ore with different emissivity and different temperature, all of this caused by the internal charge tumbling inside the mill (1).

The infrared spectrum cameras (16) take and record infrared images to be transmitted with the infrared image (18) data transmission media to the data processing media (20). If a body with a higher emissivity—due to temperature—is found, then that image is a broken/worn out ball coming out through the slot (5) of the screen (4). In this way we can count the balls discharged by the SAG Mill (1). This count shall also discriminate between worn out balls (rounded) and cracked balls (pieces with irregular shape). In order to do so, the visual spectrum camera (17) is used to capture and record the high resolution image of the balls (9) showing the contour and size of the worn out and/or cracked balls.

The data processing media (20) process data from infrared images and/or visual spectrum and transmit such processed data by means of data transmission control media (21) as information to a control center (22), which determines the actions to be taken, depending on the information provided by the data processing media (20). The Control Center (22) sends corrective instructions (23) to a Control Medium or to the SAG Mill (1) operator, in order to correct the problem informed by the data processing media (20).

Figure 9:
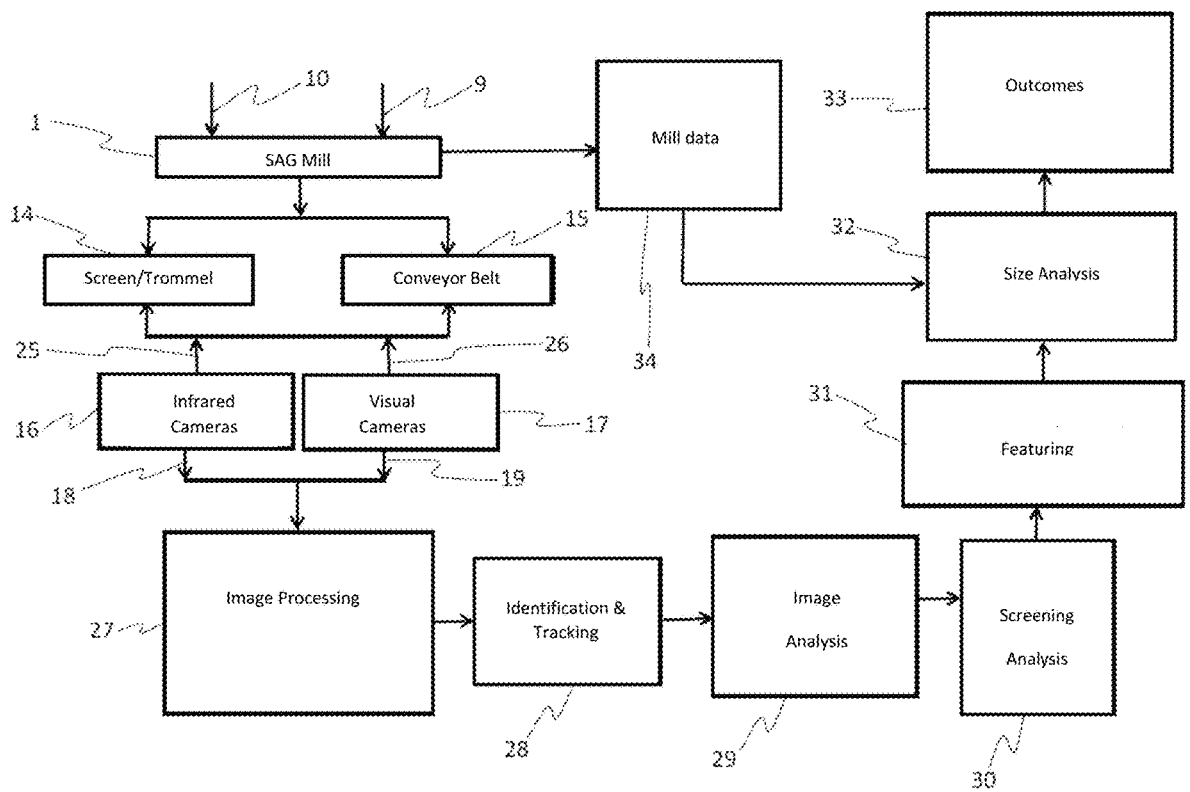
FIG. 9 shows a Flow Chart of each of the stages for the process of this invention.

Just as shown in the Flow Chart of FIG. 9, the digital processing performed by the data processing media (20) starts with the Geometry Module (27), performing the background subtraction, the intensity adjustment and the morphological operations. Later, in the ID Module (26) balls are tracked and an emissivity, morphology and dimensions operation is performed in an Image Scanning Module (27)

The Charge Flow (8) made up of the ore (10) and the balls (9), passing through the slots (5) of the internal grating (4) of the SAG Mill (1), reaches the surface of the screen (24) on the external screen/screen/trommel (14), or else on the conveyor belt (15), where—at least—one infrared spectrum camera (16) takes a set of infrared images (25) and—at least—one visual spectrum camera (17) takes a set of visual images (26). At least such said infrared spectrum camera (16) sends the infrared images (25) taken by the infrared image (18) data transmission media and—at least—such visual spectrum camera (17) sends the visual images (26) taken by the visual spectrum transmission (19) to the data processing media (20).

The images (25, 26) sent by the transmission media (18, 19) are received in an Image Conditioning Module (27), where such taken images (25, 26) are processed. In the Module (27) an image conditioning process is performed, where the geometry of the ore (10) and the balls (9) is subtracted from the background, leaving only the image of the ore, the worn out balls and of the broken and/or cracked balls. This Module (27) adjusts the image intensity in order to determine the morphology of the ore and/or balls. The information provided by the module (27) is transferred to the ID and Follow up Module (28) of the components conveyed on the screen or trommel (14), or else, on the conveyor belt (15), whose images have already been conditioned. The information of the ore/balls identified on the screen/trommel (14), or else, on the conveyor belt (15), is sent to a module (29) to be analyzed by using emissivity, morphology & sizing techniques. The outcome of this analysis is sent to a Discrimination Analysis Module (30) where the balls (9) and balls pieces (12) are identified from the ore (10).

The next step of the process is the Featuring Model (31) where worn out balls and/or ball pieces are counted, featuring sizes and/or shapes of the balls (9), i.e., the metal on the screen or trommel (14) or on the conveyor belt (15). Based on the analysis, the volume of the worn out balls and pieces of broken balls is determined. Once the steel density is known, the mass of steel coming out from the SAG Mill (1) is determined. This datum is retrieved per specific points or as mass flow, according to a period of time, such as, for instance, per hour. In this way, the rough amount of metal coming out from the SAG Mill (1) is retrieved online and in real time.

In the Module (32) balls and/or ball pieces are analyzed, according to the slot size on the screen. This size analysis, is made by comparing the size of the worn out balls and/or broken balls pieces with the slot size on the screen. If the formers are bigger, a crack appeared on the internal grating. The size of the hole produced shall be determined by measuring the biggest size of ore on the external screen.

In order to do so, the Analysis Module (32), performs an analysis aimed to retrieve the sizes of the slots on the grating, based on the maximum balls size and of ore. The analysis is made using the screen slot size data, size of the recharge ball (new ball added to the mill) and process data, along with the mill data, such as speed, power, weight (retrieved from the charge cells and/or from oil pressure on the bearings) and noise, previously loaded in a mill data (34) module. The size of size of the recharge ball may be entered by the mill operator and the process data may be directly retrieved when connecting with the Operational Control System of the SAG Mill (1).

The module (33) provides the results of the foregoing process, thus providing information about the outcome of balls and/or ball pieces. In case balls size is bigger than the slot size on the internal grating being used, an alarm shall be triggered, as this is an anomaly. Likewise, if the amount of balls on the screen/trommel (14) or on the conveyor belt (15) is higher than a pre set value/range of values, the system shall trigger an alarm, so that the Control Center (22) a control medium or else the mill operator take the necessary corrective measures for the milling process. The same happens when there are broken balls on the screen and/or trommel or on the conveyor belt, thus an alarm is triggered.

A significant reduction on the amount of balls and/or ball pieces on the external screen and/or conveyor belt may provide a signal of "blinding" or "clogging" of the screen which may cause clogging of the material passing through the screen. A significant increase of the amount of balls and/or ball pieces on the external screen or on the conveyor belt may indicate balls have a poor quality thus causing excessive wear out and/or breakage or else it may be it is a poor operating condition causing damages in the charge of balls.

The invention claimed is:

1. A system aimed to detect worn out/broken balls and ore on the surface, working as a mirror (24) of a screen or trommel (14) that retains the oversize material coming out from the SAG Mill, or, from a conveyor belt (15), wherein the system includes:
   - at least one infrared spectrum camera (16) capturing and recording a set of infrared images (25), from the surface of the screen or trommel (14), or, from the surface of the conveyor belt (15);
   - infrared image data transmission media (18) connected to at least one infrared spectrum camera (16);
   - at least one visual spectrum camera (17) capturing and recording a set of visual images (26), from the surface of the screen or trommel (14), or from the surface of the conveyor belt (15);
   - transmission media of visual spectrum image data (19), connected to at least one visual spectrum camera (17);
   - data processing medium (20) with reception media receiving the infrared image data (18) and the visual spectrum image data (19) to process them and generate control data;
   - control data transmission media (21) connected to say data processing medium (20);
   - a control center (22) receiving the control data (21) to send corrective instructions (23) to a control media or operator of the SAG Mill.

2. A system aimed to detect worn out/broken balls and ore, according to claim 1, wherein the data processing medium (20) is a conventional processor.

3. A system aimed to detect worn out/broken balls and ore, according to claim 1, wherein the data processing medium (20) is a Personal Computer (PC).

4. A system aimed to detect worn out/broken balls and ore, according to claim 1, wherein the data processing medium (20) is a Programmable Logic Controller, PLC.

5. A system aimed to detect worn out/broken balls and ore, according to claim 1, wherein the infrared image (18) data transmission media are wired.

6. A system aimed to detect worn out/broken balls and ore, according to claim 1, wherein the data transmission media of infrared image (18) are wireless.

7. A system aimed to detect worn out/broken balls and ore, according to claim 1, wherein the data transmission media of visual spectrum image (19) are wired.

8. A system aimed to detect worn out/broken balls and ore, according to claim 1, wherein the data transmission media of visual spectrum image (19) are wireless.

9. A system aimed to detect worn out/broken balls and ore, according to claim 1, wherein the processing media (20) comprises:
   - an Image Processing Module (27) aimed to process the image by removing the geometry of the ore (10), balls (9) and balls pieces (12) from the background, performing an intensity adjustment and morphological operations;
   - an Identification & Tracking Module for elements (28);
   - an Image Analysis Module (29) aimed to determine emissivity, morphology and dimensions of the ore (10), the balls (9) and balls pieces (12);
   - a Screening Module for balls and balls pieces (30);
   - a Featuring Module (31) where worn out balls and balls pieces are counted, wherein the sizes and shapes of the balls and balls pieces are identified (9);
   - an Analysis Module (32) where the slots sizes of the internal grate mill are obtained, based on the maximum size of balls and ore; and
   - an Outcome Module (33) where the output rate of balls and balls pieces is obtained, This Module can trigger an alarm in case of abnormal balls size/balls pieces and another alarm triggered due to abnormal amounts of balls and balls pieces.

10. A process aimed to detect worn out/broken balls and ore on the surface of a screen or trommel (14), working as a mirror (24) whose objective is to retain the oversize material coming out from the SAG Mill (1), or from the conveyor belt (15), wherein it comprises the following steps:
  (a) capture and record infrared images (25) from that mirror surface (24) on the screen or trommel (14), or on the conveyor belt (15);
  (b) transmit the infrared images (25) captured through infrared image data transmission media (18), to a data processing medium (20);
  (c) capture and record visual spectrum images (26) from that mirror surface (24) on a screen/on a trommel (14), or on a conveyor belt (15);
  (d) transmit the visual spectrum images (25) captured through data transmission media visual spectrum image (19) to a data processing medium (20);
  (e) processing the images by using an Image Processing Module (27), aimed to process captured images (25, 26):
    (e1) remove the image background in order to leave the ore image (10), the worn out balls (9) and the cracked/broken balls (12);
    (e2) adjust the intensity of the images obtained in step (e1);
    (e3) perform morphology determination of ore, balls and balls pieces;
  (f) identify and monitor ore (10), pieces of cracked/broken balls (12) and worn out balls (9) on the surface of the screen or trommel (14), or conveyor belt (15), In order to do so an Identification & Tracking Module (28) shall be used the images processed in step (e);
  (g) analyze the emissivity, morphology and dimensions in an Image Analysis Module (29);
  (h) make a differentiation among worn out balls (9) pieces of cracked/broken balls (12) against the ore (10), That process shall be performed in a Screening Module for balls and balls pieces (30);
  (i) perform a featuring of worn out balls (9) and pieces of cracked/broken balls (12) in a Featuring Module (31), counting the metal pieces, featuring sizes and shapes;
  (j) perform an analysis of the mill by using an Analysis Module (32), retrieving size data of the screen slot, size of the recharge ball and process data, combined with mill data, such as speed, power, weight and noise, All these data have been previously loaded into a Mill Data Module (34); and
  (k) display process results in an Outcome Display Module (33) showing the discharge rate of worn out balls and pieces of broken/cracked balls, The Module has the functionality to trigger an alarm in case of abnormal size of worn out balls, in case of abnormal amount of balls and balls pieces, and an alarm in case of abnormal shape of the balls pieces.

* * * * *